United States Patent
Kinoshiata

(10) Patent No.: US 12,422,850 B2
(45) Date of Patent: Sep. 23, 2025

(54) INFORMATION PROCESSING APPARATUS AND INFORMATION PROCESSING METHOD TO MANAGE PATH INFORMATION OF A MOBILE ROBOT

(71) Applicant: SONY GROUP CORPORATION, Tokyo (JP)

(72) Inventor: Masaya Kinoshiata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 342 days.

(21) Appl. No.: 17/904,111

(22) PCT Filed: Dec. 25, 2020

(86) PCT No.: PCT/JP2020/049010
§ 371 (c)(1),
(2) Date: Aug. 12, 2022

(87) PCT Pub. No.: WO2021/166457
PCT Pub. Date: Aug. 26, 2021

(65) Prior Publication Data
US 2023/0071598 A1    Mar. 9, 2023

(30) Foreign Application Priority Data
Feb. 21, 2020    (JP) .................... 2020-028015

(51) Int. Cl.
*B25J 9/16*    (2006.01)
*B25J 5/00*    (2006.01)
(Continued)

(52) U.S. Cl.
CPC ......... *G05D 1/0214* (2013.01); *B62D 57/032* (2013.01); *G05D 1/0891* (2013.01)

(58) Field of Classification Search
CPC ... G05D 1/0214; G05D 1/0891; B62D 57/032
(Continued)

(56) References Cited

U.S. PATENT DOCUMENTS

| 11,672,199 B2 * | 6/2023 | Lee ...................... G05D 1/0212 |
| | | 701/25 |
| 2003/0125839 A1 * | 7/2003 | Takenaka ............. B62D 57/032 |
| | | 700/245 |

(Continued)

FOREIGN PATENT DOCUMENTS

| CN | 108931981 A | 12/2018 |
| CN | 110260875 A | 9/2019 |

(Continued)

OTHER PUBLICATIONS

International Search Report and Written Opinion of PCT Application No. PCT/JP2020/049010, issued on Mar. 23, 2021, 08 pages of ISRWO.

*Primary Examiner* — Angela Y Ortiz
*Assistant Examiner* — Laura E Linhardt
(74) *Attorney, Agent, or Firm* — CHIP LAW GROUP

(57) ABSTRACT

Provided is an information processing apparatus that processes information regarding a path of a mobile robot. The information processing apparatus includes a management section that manages path information for each path, the path information including postural stability information acquired when the mobile robot traverses the path. The postural stability information includes at least one of a variance of a position of center of gravity or a postural variance acquired during travel of the mobile robot in the path. Also, the postural stability information includes a CoP control quantity that includes a deviation between a target CoP and an actual measured value of the mobile robot whose walking is controlled based on ZMP. Also, the postural stability information further includes a landing position
(Continued)

correction quantity that includes an error between a planned floor touching point and an actual measured value of the mobile robot that walks with multiple legs.

9 Claims, 8 Drawing Sheets

(51) Int. Cl.
  *B62D 57/032* (2006.01)
  *G05D 1/00* (2006.01)
(58) Field of Classification Search
  USPC .......................................................... 701/25
  See application file for complete search history.

(56) References Cited

U.S. PATENT DOCUMENTS

| | | | |
|---|---|---|---|
| 2004/0164697 A1* | 8/2004 | Iribe .................... B25J 13/085 |
| | | | 318/568.12 |
| 2005/0021176 A1* | 1/2005 | Takenaka ............ B62D 57/032 |
| | | | 700/245 |
| 2005/0125099 A1* | 6/2005 | Mikami ............... B62D 57/032 |
| | | | 700/245 |
| 2005/0267630 A1* | 12/2005 | Kajita .................. B62D 57/032 |
| | | | 700/245 |
| 2006/0184278 A1 | 8/2006 | Nihei |
| 2009/0005906 A1* | 1/2009 | Tajima ................. B62D 57/032 |
| | | | 901/1 |
| 2010/0017028 A1* | 1/2010 | Suga .................... B62D 57/032 |
| | | | 901/1 |
| 2010/0250001 A1* | 9/2010 | Hodgins .............. B62D 57/032 |
| | | | 700/245 |
| 2011/0106307 A1 | 5/2011 | Kim |
| 2012/0022781 A1* | 1/2012 | Wilson ............... G01C 21/3469 |
| | | | 701/410 |
| 2012/0143374 A1* | 6/2012 | Mistry ................. B62D 57/032 |
| | | | 901/47 |
| 2012/0166048 A1* | 6/2012 | Inoue ................... B62K 11/007 |
| | | | 701/49 |
| 2015/0231786 A1* | 8/2015 | Doi ........................ B25J 9/1605 |
| | | | 700/245 |
| 2016/0059408 A1* | 3/2016 | Isobe ....................... B25J 5/007 |
| | | | 901/29 |
| 2016/0368149 A1* | 12/2016 | Inaba .................... G05D 1/0223 |
| 2017/0174285 A1* | 6/2017 | Yu ........................ B60L 15/2009 |
| 2019/0233027 A1* | 8/2019 | Yamamoto ............ B62D 61/12 |
| 2020/0201356 A1* | 6/2020 | Schuh ................. B60W 30/165 |
| 2020/0342756 A1* | 10/2020 | MacKenzie ....... B60W 50/0098 |
| 2021/0094178 A1* | 4/2021 | Kim ........................ B25J 13/085 |
| 2021/0187749 A1* | 6/2021 | Lee ........................ B25J 9/0009 |
| 2022/0088780 A1* | 3/2022 | Abdul-Hadi ......... B25J 11/0095 |
| 2023/0071598 A1* | 3/2023 | Kinoshiata ........... G05D 1/0214 |
| 2023/0073900 A1* | 3/2023 | Spenninger ........... B25J 9/1607 |
| 2023/0205208 A1* | 6/2023 | Hult ..................... G05D 1/0212 |
| | | | 701/25 |
| 2023/0249688 A1* | 8/2023 | Satake ............ B60W 30/18159 |
| | | | 701/25 |
| 2024/0181637 A1* | 6/2024 | Gillett ....................... B25J 17/00 |
| 2024/0273255 A1* | 8/2024 | Cochevelou ........... G06F 30/27 |
| 2024/0278422 A1* | 8/2024 | Sakamoto ............. G06V 20/50 |

FOREIGN PATENT DOCUMENTS

| | | |
|---|---|---|
| JP | 07-072924 A | 3/1995 |
| JP | 2007-257274 A | 10/2007 |
| JP | 2019-079375 A | 5/2019 |

* cited by examiner

FIG. 3

| No. | Path Pattern | Date | Robot ID | Posture Stability Evaluation Item | | | | | Comprehensive Stability Discrimination Value (T) |
|---|---|---|---|---|---|---|---|---|---|
| | | | | Deviation of Position of Center of Gravity | Postural Deviation | CoP Control Quantity | Landing Position Correction Quantity | ... | |
| 1 | Path A | * | * | * | * | * | * | * | A |
| 2 | Path B | * | * | * | * | * | * | * | B |
| 3 | Path C | * | * | * | * | * | * | * | C |
| 4 | Path D | * | * | * | * | * | * | * | D |

FIG. 7

| No. | Path Pattern | Date | POSTURE STABILITY EVALUATION ITEM ||||| COMPREHENSIVE STABILITY DISCRIMINATION VALUE (T) |
| --- | --- | --- | --- | --- | --- | --- | --- | --- |
| | | | DEVIATION OF POSITION OF CENTER OF GRAVITY | POSTURAL DEVIATION | CoP CONTROL QUANTITY | LANDING POSITION CORRECTION QUANTITY | ... | |
| 1 | Path A | * | * | * | * | * | * | A |
| 2 | Path B | * | * | * | * | * | * | B |
| 3 | Path C | * | * | * | * | * | * | C |
| 4 | Path D | * | * | * | * | * | * | D |
| | | | | | | | | |

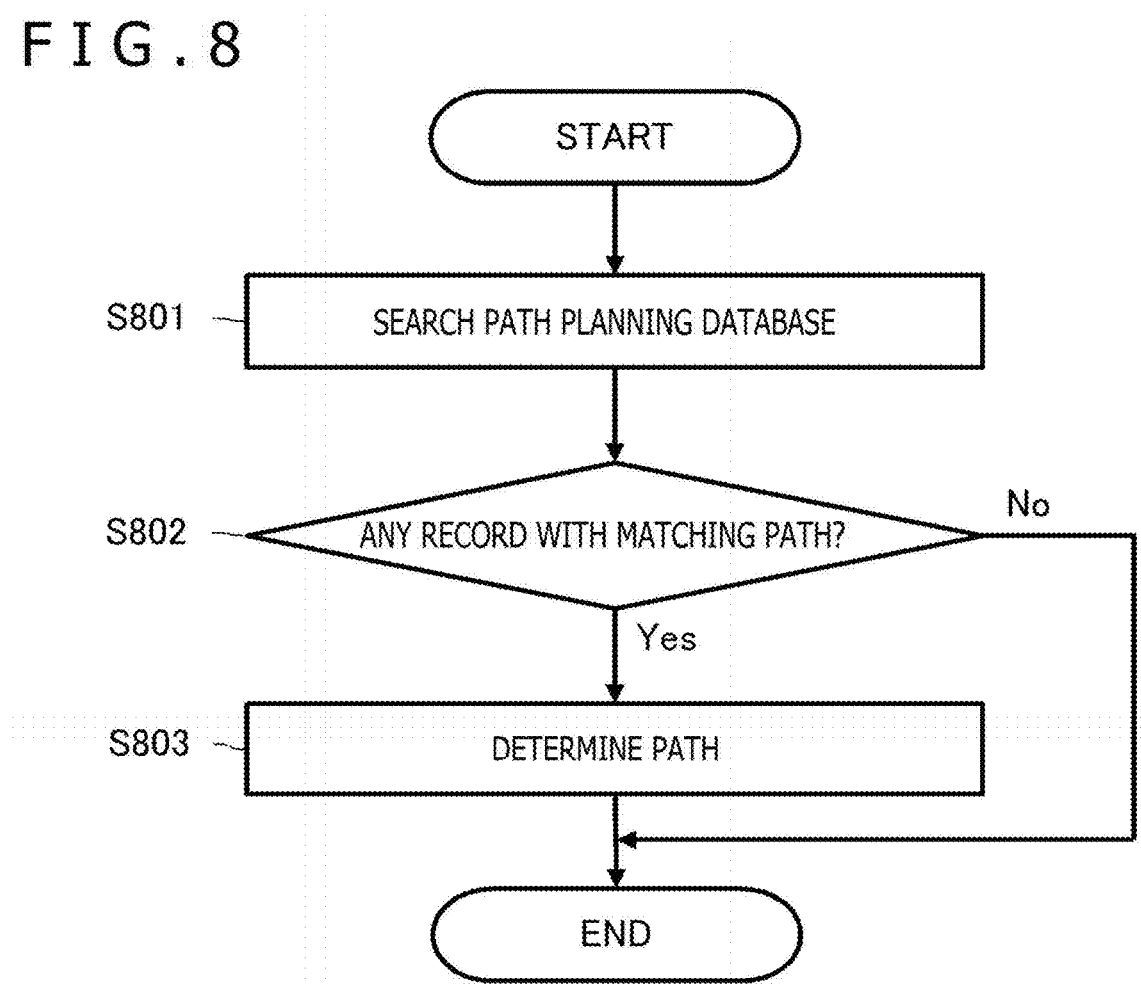

INFORMATION PROCESSING APPARATUS AND INFORMATION PROCESSING METHOD TO MANAGE PATH INFORMATION OF A MOBILE ROBOT

CROSS REFERENCE TO RELATED APPLICATIONS

This application is a U.S. National Phase of International Patent Application No. PCT/JP2020/049010 filed on Dec. 25, 2020, which claims priority benefit of Japanese Patent Application No. JP 2020-028015 filed in the Japan Patent Office on Feb. 21, 2020. Each of the above-referenced applications is hereby incorporated herein by reference in its entirety.

TECHNICAL FIELD

The technology disclosed in the present specification (hereinafter referred to as the "present disclosure") relates to an information processing apparatus, an information processing method, a computer program, and a mobile robot that process information regarding a path of a mobile robot.

BACKGROUND ART

Recently, mobile apparatuses such as a robot and a drone have widely and increasingly been used. In order to travel to a destination, the mobile apparatus searches for a path to the destination and travels by autonomously tracking the path that has been searched for. For example, there has been proposed a path search system that extracts multiple candidate paths from a reference point to a target point, evaluates each candidate path on the basis of a path length from the reference point to the target point and past path history information (refer, for example, to PTL 1).

CITATION LIST

Patent Literature

[PTL 1]
Japanese Patent Laid-Open No. 2007-257274

SUMMARY

Technical Problem

It is an object of the present disclosure to provide an information processing apparatus, an information processing method, a computer program, and a mobile robot that process information regarding a path of a mobile robot.

Solution to Problem

A first aspect of the present disclosure is an information processing apparatus that includes a management section that manages path information for each path, the path information including postural stability information acquired when a mobile robot traverses the path.

The postural stability information includes at least one of a variance of a position of center of gravity or a postural variance acquired during travel of the mobile robot in the path. Also, the postural stability information includes a CoP control quantity that includes a deviation between a target CoP and an actual measured value of the mobile robot whose walking is controlled on the basis of a ZMP. Also, the postural stability information further includes a landing position correction quantity that includes an error between a planned floor touching point and an actual measured value of the mobile robot that walks with multiple legs.

Also, a second aspect of the present disclosure is an information processing method that includes an acquisition step of acquiring, from a mobile robot, path information for each path, the path information including postural stability information acquired when the mobile robot traverses the path, and a recording step of recording the path information in a management section.

Also, a third aspect of the present disclosure is a computer program written in a computer-readable form, the computer program causing a computer to function as a management section adapted to manage path information for each path, the path information including postural stability information acquired when a mobile robot traverses the path.

The computer program according to the third aspect of the present disclosure defines a computer program written in a computer-readable form so as to realize a predetermined process on the computer. In other words, installation of the computer program according to the third aspect of the present disclosure into the computer has a collaborative effect on the computer, which makes it possible to provide an effect similar to those of the information processing apparatus according to the first aspect of the present disclosure.

Also, a fourth aspect of the present disclosure is a mobile robot that includes a mobile section, a transmission section adapted to transmit, to an external apparatus, path information including postural stability information regarding a main body, the postural stability information being acquired when the mobile robot traverses a path by using the mobile section, and a planning section adapted to plan a path on the basis of the postural stability information included in the path information received from the external apparatus.

Advantageous Effect of Invention

According to the present disclosure, it is possible to provide an information processing apparatus, an information processing method, a computer program, and a mobile robot that process information regarding a path in which stability of the mobile robot which is travelling in the path is taken into consideration.

It should be noted that the advantageous effect described in the present specification is merely illustrative, and advantageous effects of the present disclosure are not limited thereto. Also, the present disclosure may further have additional advantageous effects other than that described above.

Still other objects, features, and advantages of the present disclosure will become apparent from a detailed description based on an embodiment described later and attached drawings.

BRIEF DESCRIPTION OF DRAWINGS

FIG. 3 is a diagram illustrating an example of a path evaluation database.

FIG. 7 is a diagram illustrating a configuration example of a path evaluation database 601.

FIG. 8 is a flowchart illustrating a processing procedure for a robot 602 that operates on the path planning system 600 to plan a path by using the path evaluation database 601.

DESCRIPTION OF EMBODIMENT

A detailed description will be given below of an embodiment of the present disclosure with reference to drawings.

A. Configuration of Robot

The present disclosure is intended, above all, for a legged robot that includes multiple legs and walks on a road surface, among mobile robots.

Figure 1:
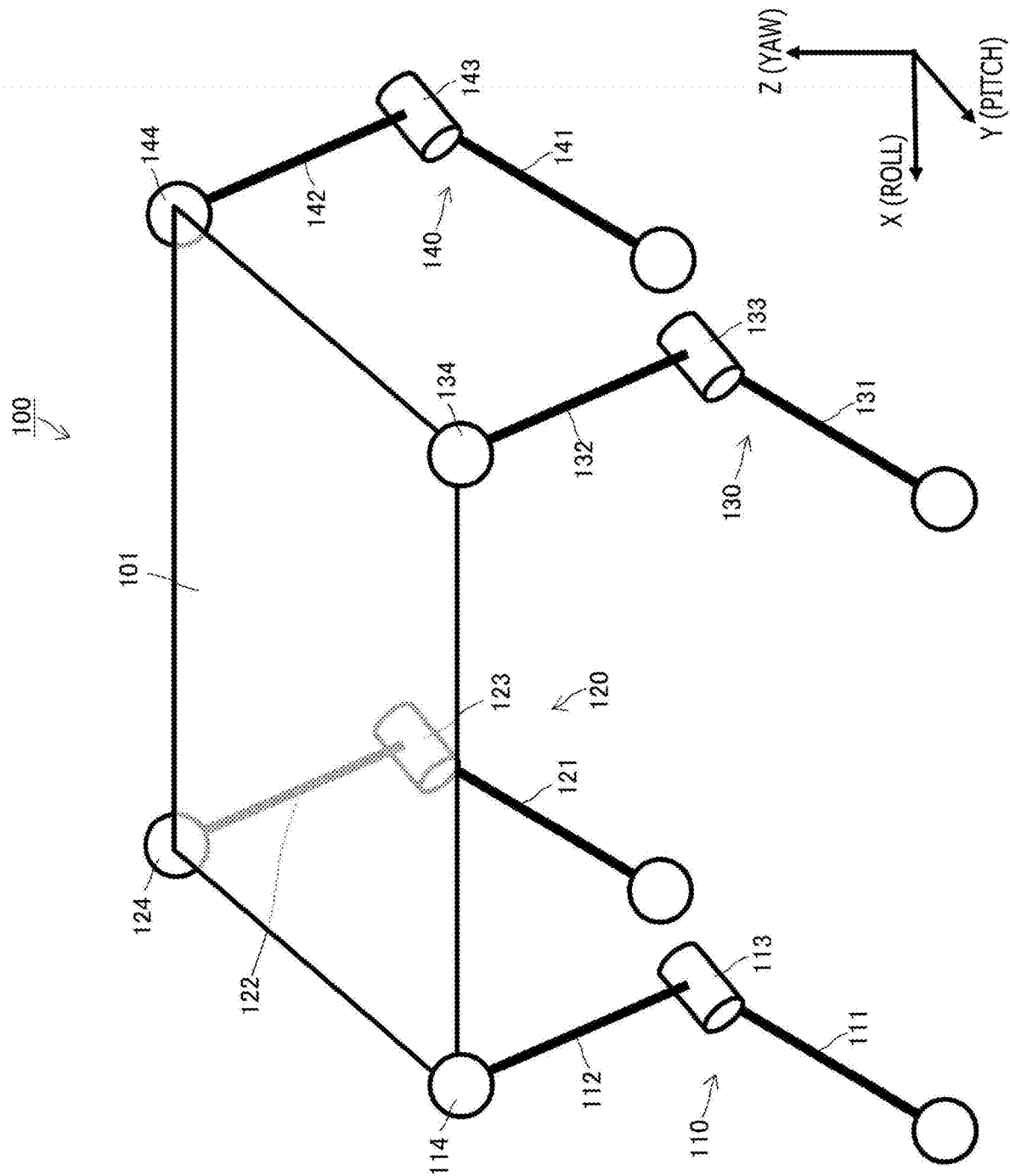
FIG. 1 is a diagram illustrating an example of a degree-of-freedom configuration of a robot apparatus 100 including multiple legs.

FIG. 1 schematically illustrates an example of a degree-of-freedom configuration of a robot apparatus 100 to which the present disclosure is applied and which includes multiple legs. The robot apparatus 100 illustrated in FIG. 1 includes a torso section 101 and four mobile legs 110, 120, 130, and 140 that are coupled to four corners of the torso section 101. Here, the leg 110 is a left front leg (LF), the leg 120 is a right front leg (RF), the leg 130 is a left rear leg (LR), and the leg 140 is a right rear leg (RR). The robot apparatus 100 can walk by synchronously moving the legs 110, 120, 130, and 140 (by alternately switching between standing legs and swinging legs). Also, it is also assumed that baggage is loaded onto the torso section 101 and that the robot apparatus 100 transfers the baggage loaded on the torso section 101.

The leg 110 includes two links 111 and 112 and a joint section 113 that connects the link 111 and the link 112 to each other. Another end (lower end) of the link 112 corresponds to a sole and is placed on a floor surface. Also, an upper end of the link 111 is attached to the torso section 101 via a joint section 114. The joint section 113 has a rotational degree of freedom about a pitch axis and can drive the link 111 relative to the link 112 about the pitch axis by using an actuator (not illustrated) such as a pitch axis rotation motor. Also, the joint section 114 has at least rotational degrees of freedom about the pitch axis and a roll axis and can drive the link 112 relative to the torso section 101 about the pitch axis and the roll axis by using actuators (not illustrated) such as the pitch axis rotation motor and a roll axis rotation motor. It should be noted that the link 112 and the link 111 will also be referred to as a first link and a second link, respectively, in the order of closeness to the torso section 101. Further, the joint section 114 and the joint section 113 will also be referred to as a first joint and a second joint, respectively, in the order of closeness to the torso section 101.

Also, the leg 120 includes two links 121 and 122 and a joint section 123 that connects the link 121 and the link 122 to each other. Another end (lower end) of the link 121 corresponds to a sole and is placed on the floor surface. Also, an upper end of the link 122 is attached to the torso section 101 via a joint section 124. The joint section 123 has a rotational degree of freedom about the pitch axis and can drive the link 121 relative to the link 122 about the pitch axis by using an actuator (not illustrated) such as the pitch axis rotation motor. Also, the joint section 124 has at least rotational degrees of freedom about the pitch axis and the roll axis and can drive the link 122 relative to the torso section 101 about the pitch axis and the roll axis by using actuators (not illustrated) such as the pitch axis rotation motor and the roll axis rotation motor. It should be noted that the link 122 and the link 121 will also be referred to as a first link and a second link, respectively, in the order of closeness to the torso section 101. Further, the joint section 124 and the joint section 123 will also be referred to as a first joint and a second joint, respectively, in the order of closeness to the torso section 101.

Also, the leg 130 includes two links 131 and 132 and a joint section 133 that connects the link 131 and the link 132 to each other. Another end (lower end) of the link 131 corresponds to a sole and is placed on the floor surface. Also, an upper end of the link 132 is attached to the torso section 101 via a joint section 134. The joint section 133 has a rotational degree of freedom about the pitch axis and can drive the link 131 relative to the link 132 about the pitch axis by using an actuator (not illustrated) such as the pitch axis rotation motor. Also, the joint section 134 has at least rotational degrees of freedom about the pitch axis and the roll axis and can drive the link 132 relative to the torso section 101 about the pitch axis and the roll axis by using actuators (not illustrated) such as the pitch axis rotation motor and the roll axis rotation motor. It should be noted that the link 132 and the link 131 will also be referred to as a first link and a second link, respectively, in the order of closeness to the torso section 101. Further, the joint section 134 and the joint section 133 will also be referred to as a first joint and a second joint, respectively, in the order of closeness to the torso section 101.

Also, the leg 140 includes two links 141 and 142 and a joint section 143 that connects the link 141 and the link 142 to each other. Another end (lower end) of the link 141 corresponds to a sole and is placed on the floor surface. Also, an upper end of the link 142 is attached to the torso section 101 via a joint section 144. The joint section 143 has a rotational degree of freedom about the pitch axis and can drive the link 141 relative to the link 142 about the pitch axis by using an actuator (not illustrated) such as the pitch axis rotation motor. Also, the joint section 144 has at least rotational degrees of freedom about the pitch axis and the roll axis and can drive the link 142 relative to the torso section 101 about the pitch axis and the roll axis by using actuators (not illustrated) such as the pitch axis rotation motor and the roll axis rotation motor. It should be noted that the link 142 and the link 141 will also be referred to as a first link and a second link, respectively, in the order of closeness to the torso section 101. Further, the joint section 144 and the joint section 143 will also be referred to as a first joint and a second joint, respectively, in the order of closeness to the torso section 101.

It should be understood that although the robot apparatus 100 illustrated in FIG. 1 includes four legs, the technology disclosed in the present specification is applicable to even the robot apparatus 100 that has two or three legs or five or more legs.

Also, although not illustrated in FIG. 1, the torso section 101 may have a head section with a camera, a speaker, and the like, a working arm, etc.

Figure 2:
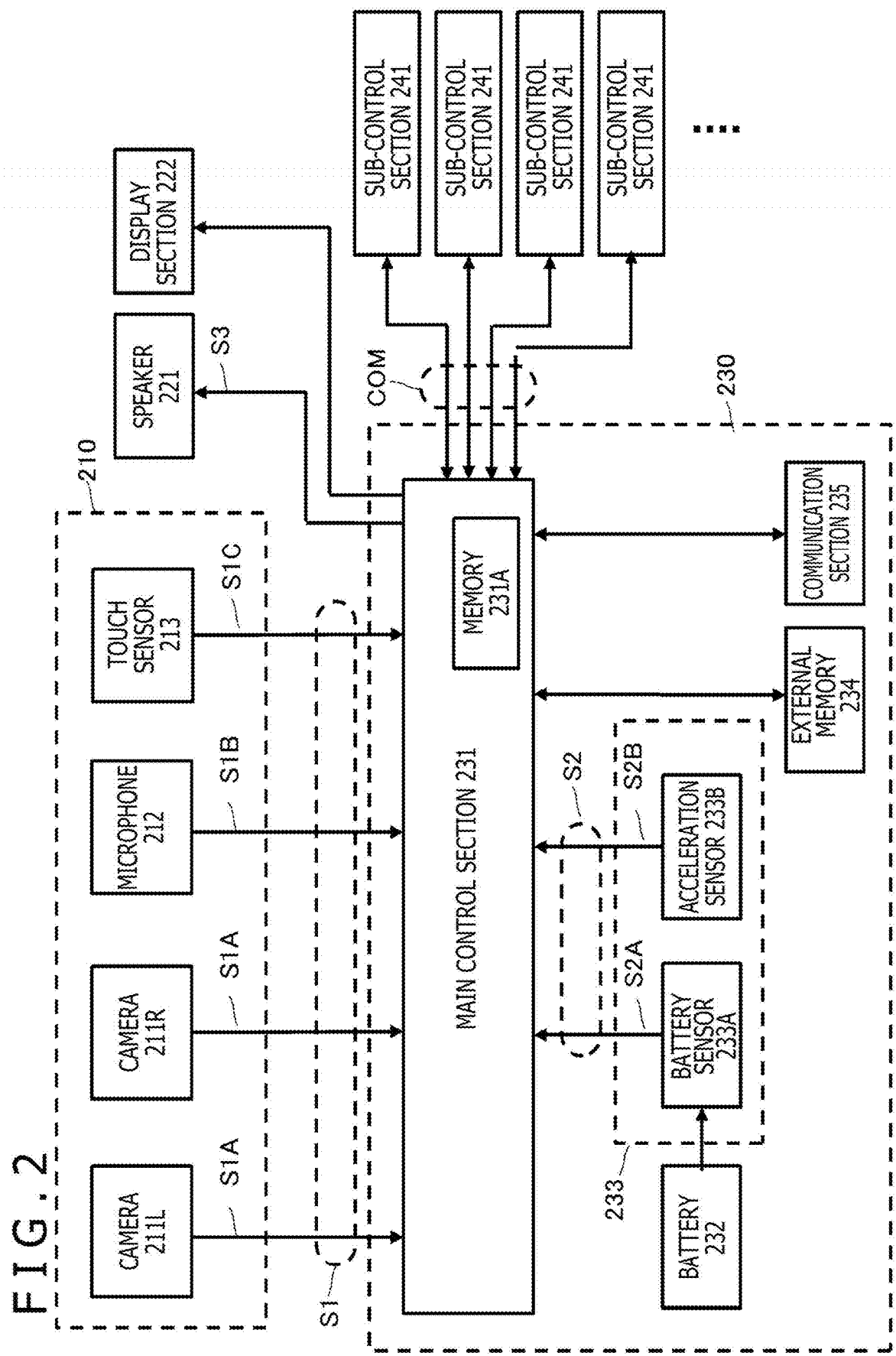
FIG. 2 is a diagram illustrating a configuration example of an electrical system of the robot apparatus 100.

FIG. 2 illustrates a configuration example of an electrical system of the robot apparatus 100.

The robot apparatus 100 has cameras 211L and 211R that function as left and right "eyes" of the robot apparatus 100, a microphone 212 that functions as an "ear," a touch sensor 213, and the like that are disposed at predetermined positions, as an external sensor section 210. RGB cameras that include an imaging element such as a CMOS (Complementary Metal Oxide Semiconductor) or a CCD (Charge Coupled Device) are, for example, used as the cameras 211L and 211R.

It should be noted that although not illustrated in FIG. 2, the external sensor section 210 may further include other sensors. For example, the external sensor section 210 may include sole sensors that measure, for example, ground reaction forces that act on the soles of the respective legs 110, 120, 130, and 140. Each sole sensor includes a 6DOF (Degree Of Freedom) force sensor.

Also, the external sensor section 210 may include a sensor capable of measuring or estimating a direction of and a distance to a predetermined target, such as LIDAR (Laser Imaging Detection and Ranging), a TOF (Time Of Flight) sensor, or an LRF (Laser Range Finder). Also, the external sensor section 210 may include a GPS (Global Positioning System) sensor, an infrared sensor, a temperature sensor, a humidity sensor, an illuminance sensor, and the like.

Also, the robot apparatus 100 has a speaker 221, a display section 222, and the like that are disposed at predetermined positions, as an output section. The speaker 221 has, for example, a function to give voice guidance by outputting voice. Also, the display section 222 displays a state of the robot apparatus 100 and a response to a user.

The control unit 230 has a main control section 231, a battery 232, an internal sensor section 233, an external memory 234, and a communication section 235 that are disposed inside the control unit 230. The internal sensor section 233 includes a battery sensor 233A, an acceleration sensor 233B, and the like.

The cameras 211L and 211R of the external sensor section 210 capture images of a surrounding condition and send image signals S1A thus acquired to the main control section 231. The microphone 212 collects a voice input from the user and sends each voice signal S1B thus acquired to the main control section 231. The input voice given to the robot apparatus 100 from the user also includes a wake word, various instruction voices (voice commands) such as "walk," "turn right," "hurry," and "stop," and the like. It should be noted that although only one microphone 82 is illustrated in FIG. 2, two or more microphones may be provided like left and right ears to estimate the direction of a sound source.

Also, the touch sensor 213 of the external sensor section 210 is installed, for example, on a placement surface of the torso section 101, detects pressure received on a position where the baggage is loaded, and sends a detection result to the main control section 231, as a pressure detection signal S1C.

The battery sensor 233A of the internal sensor section 233 detects a remaining energy level of the battery 232 at predetermined intervals and sends the detection result to the main control section 231, as a remaining battery level detection signal S2A.

The acceleration sensor 233B measures accelerations of the robot apparatus 100 during its travel, in three axial directions (x (roll) axis, y (pitch) axis, and z (yaw) axis) at predetermined intervals and sends the detection result thereof to the main control section 231, as an acceleration detection signal S2B. The acceleration sensor 233B may be, for example, an IMU (Inertial Measurement Unit) having a triaxial gyro, a tridirectional acceleration sensor, and the like. It is possible to measure the angle and the acceleration of a main body of the robot apparatus 100 or the torso section 101.

The external memory 234 stores programs, data, control parameters, and the like and supplies, as necessary, the programs and the data to a memory 231A incorporated in the main control section 231. Also, the external memory 234 receives data and the like from the memory 231A and stores the received data. It should be noted that the external memory 234 may be configured as a cartridge memory card such as an SD card and may be detachable from the main body of the robot apparatus 100 (or from the control unit 230).

The communication section 235 performs data communication with the outside on the basis of a communication scheme such as Wi-Fi (registered trademark) or LTE (Long Term Evolution). For example, the communication section 235 can acquire programs, such as applications, executed by the main control section 231 and data required for execution of the programs from the outside via the communication section 235.

The main control section 231 incorporates the memory 231A. The memory 231A stores programs and data, and the main control section 231 performs various processes by executing the programs stored in the memory 231A. That is, the main control section 231 determines surrounding and internal conditions of the robot apparatus 100, whether or not any user instruction has been given or whether or not there has been any user engagement, and the like, on the basis of the image signals S1A, the voice signal S1B, and the pressure detection signal S1C (hereinafter collectively referred to as external sensor signals S1) supplied respectively from the cameras 211L and 211R, the microphone 212, and the touch sensor 213 of the external sensor section 210 and the remaining battery level detection signal S2A and the acceleration detection signal S2B (hereinafter collectively referred to as internal sensor signals S2) supplied respectively from the battery sensor 233A, the acceleration sensor 233B, and the like of the internal sensor section 233. It should be noted that information regarding the weight and the position of center of gravity of the main body of the robot apparatus 100 (in a state in which no baggage is loaded on the torso section 101) may be stored in advance in the memory 231A.

Then, the main control section 231 determines behavior of the robot apparatus 100 and an expressive motion to be activated toward the user, on the basis of determination results of the surrounding and internal conditions of the robot apparatus 100, whether or not any user instruction has been given or whether or not there has been any user engagement, a control program stored in advance in the internal memory 231A or various control parameters stored in the external memory 234 mounted at that time, and the like, after which the main control section 231 generates a control command based on the determination results and sends the control command to each of sub-control sections 241, 242, and so on.

Walking motion using the mobile legs 110 to 140 is among types of behavior of the robot apparatus 100 controlled by the main control section 231. The main control section 231 controls the postural stability of the main body of the robot apparatus 100, for example, on the basis of a ZMP (Zero Moment Point) stability discrimination standard.

The sub-control sections 241, 242, and so on take charge of operation of subsystems of the robot apparatus 100 and drive the subsystems on the basis of the control command supplied from the main control section 231. The above-described mobile legs 110, 120, 130, and 140 correspond to the subsystems and are driven under control of the sub-control sections 241, 242, 243, and 244, respectively. Specifically, the sub-control sections 241, 242, 243, and 244 control the driving of the joint sections 113, 123, 133, and 143 of the mobile legs 110 to 140 and initial displacement quantity setting of a load compensation mechanism (described later) and the like.

B. Robot Path Planning

In general, an autonomous mobile robot selects a path by calculating a cost of each path on the basis of results obtained by sensing environmental shape information such as projections and depressions of the road surface by using the camera, an LRF, and the like. It is possible to create a path plan that has a small number of projections and depressions and that provides a short path length while at the same time avoiding obstacles, for example, on the basis of the environmental shape information.

However, while environmental sensing using the camera, the LRF, and the like allows detection of the obstacles with high accuracy, it is difficult to find out about conditions such as a frozen road surface, puddles, and muddy tracks. Above all, the legged robot for which the present disclosure is intended is easily affected by the road surface. For example, the frozen road surface is slippery and makes stable walking difficult, as a result of which the path including the road surface in such a condition is disadvantageous for the legged robot. It is preferred that the legged robot select a non-slippery path that allows stable walking, even if the path is more or less narrower or longer.

Accordingly, the present disclosure proposes a path planning method for selecting an optimal path for the legged robot in consideration of not only environmental shape information but also stability of the legged robot which is walking in the path.

B-1. Path Evaluation Database

In the present disclosure, the environmental shape information and the stability of the legged robot which is walking in a path are used as path evaluation criteria. The environmental shape information can be measured by use of the camera, the LRF, and the like as has been done to date. Meanwhile, it is difficult to measure the stability of the legged robot which is walking by use of the camera and other sensors, and there is no alternative but to cause the legged robot to actually traverse the path.

If the robot topples over as a result of losing its postural stability while the robot is autonomously travelling, a significant amount of time will be lost until the robot gets back up and starts traveling again after toppling over. Also, if the robot that has toppled over is unable to get back up by itself, it is necessary for a service engineer to rush to the site. Further, there are cases where the robot may be damaged as a result of toppling over and be forced to suspend its work. The toppling over of the robot results in huge loss in terms of cost.

Accordingly, in the present disclosure, each time a robot traverses a given path, a record in which information regarding that path are associated with information regarding postural stability of the main body of the robot which is walking in the path is registered in a path evaluation database. Then, when planning a path, the robot acquires past path information by using the path evaluation database and selects a path that allows the robot to travel safely.

It is assumed that even if the path is the same, the stability of a legged robot which is walking in the path varies depending on a product specification (e.g., number of legs, leg strength, weight) of the legged robot that walks there. Accordingly, identification information regarding the robot that has traversed the path is also recorded in each record in the path evaluation database.

Also, it is assumed that when time passes after traversing of the path by the robot, the road surface condition changes, and the record information deteriorates. Alternatively, it is possible to estimate the road surface condition by identifying weather (e.g., sunny, rainy, snowy) when the robot has traversed the path, according to a date and time. Accordingly, information regarding the date and time when the robot has traversed the path is also recorded in each record of the path evaluation database.

There are no limitations on evaluation items representing the postural stability of the main body of the robot which is walking. The evaluation items representing the stability also vary depending on a technique used as a standard for controlling the stability of walking motion. The present embodiment assumes that the walking is controlled by use of the ZMP. This is a technique that sets the target ZMP within a supporting polygon of the robot main body, the supporting polygon being formed by a ground contact surfaces of the soles or the like, for use as the stability discrimination standard. The ZMP corresponds to a CoP (Center of Pressure), i.e., the center of pressure applied by the road surface.

When planning a path, the robot searches for available records from the path evaluation database and selects, for example, an optimal record for that robot, from among multiple records extracted. The available records refer, for example, to those records with a matching or similar product specification. In a case where there are multiple candidate paths, any one of the paths may be selected by statistical processing on stability information regarding each path and the like. At the time of statistical processing, a weight may be assigned to each piece of record information, commensurate with the date, similarity of the product specification, and the like.

It should be noted that the path evaluation database may be built, for example, on the cloud and that multiple or a number of robots may share the path evaluation database. Alternatively, the path evaluation database may be disposed in a single robot such that only that robot uses the path evaluation database (that is, path evaluation database may be dedicated to each apparatus).

FIG. 3 illustrates an example of the path evaluation database. Each record of the path database is managed by a serial number (No.). The serial number may be assigned in the order of registration in the path evaluation database or in the order of creation of path information. Needless to say, the serial number may be reassigned after sorting is performed with focus on a specific item included in the records.

Each record includes path identification information that identifies the path traversed by the robot, information regarding the date when the robot has traversed that path (Date), robot identification information (Robot ID), and postural stability information. It should be noted that although not illustrated in FIG. 3, each record may include environmental shape information such as projections and depressions of the road surface measured in the path by use of the camera, the LRF, and the like.

Path identification information includes information that identifies the path from the current position of the robot to the destination. In a case where the path from the current position to the destination is limited to several path patterns, information that identifies the path pattern (Path A, Path B, Path C, and so on) is entered in a path identification information field. In a case where the path evaluation database is created for each path from the current position to the destination, only path pattern information may be entered as the path identification information.

Information regarding the date and time when the robot has traversed the path identified by the path identification information (or path pattern) is entered in a date information (Date) field. There is no limitation on a date notation format. There is no need to limit the notation format to one format, and multiple notation formats may be used in combination as long as the system that uses this path evaluation database is capable of handling the multiple formats. Also, the date information may include time-of-day information.

Robot identification information (Robot ID) is information that identifies the robot that has traversed the path and may be a manufacturer's serial number or a model number of the robot. It is possible to identify the robot's product specification such as the number of legs, the leg strength, and the weight of the robot from the robot identification information. It should be noted that in the case of a transfer robot, the postural stability at the time of traversing of the same path may be assumed to vary commensurate with baggage loading conditions (e.g., whether or not baggage is loaded, size and weight of the baggage loaded). Accordingly, baggage loading information may also be added to record items and recorded in the path evaluation database in addition to the robot identification information. Also, tasks imposed on the robot by a human are not limited to transfer of baggage. When information regarding a task imposed on the robot by the human is added to the record items and the task information is recorded in the path evaluation database, it is possible to determine a path that provides high postural stability in consideration of the task.

Postural stability information includes one or multiple evaluation items that represent the postural stability measured when the robot has traversed the path. Postural stability information may include evaluation items regarding a degree of achievement of a control target value based on the stability discrimination standard applied to the robot. The evaluation items representing the stability also vary depending on the technique used as the standard for controlling the stability of walking motion. For example, the postural stability can be represented by the deviation between the control target value and the measured value of the robot which is travelling in the path or by the correction quantity for modification to the control target value. Specifically, the deviation of the position of center of gravity (deviation between a target orbit of the center of gravity and the actual orbit of the center of gravity) or the variance of the position of center of gravity, postural deviation or postural variance, and the landing position correction quantities (errors from the planned floor touching points of feet) acquired during travel in the path can be used as the postural stability evaluation items. Also, because the present embodiment assumes that the walking is controlled by use of the ZMP, the CoP control quantity (deviation between the target CoP and an actual measured value) can be used as the postural stability evaluation item. Although the variances of evaluation values of the evaluation items are recorded in the example illustrated in FIG. 3, evaluation values resulting from other statistical processing, such as the mean and the root mean square, may be recorded. Also, postural stability evaluation items other than those illustrated in FIG. 3 may be used. For example, information regarding the energy used to traverse the path may further be included in the evaluation items. The postural stability evaluation items can be added or deleted as necessary.

In order to facilitate comparison between the evaluation values of such evaluation items as described above, the evaluation values are normalized, for example, such that a maximum or minimum value of each evaluation value is 1, to achieve a uniform standard between the evaluation items.

If the evaluation values of the respective evaluation items are normalized as described above and are registered in the path evaluation database, the evaluation values of all the evaluation items can be treated in a similar manner when the robot plans a path by using the path evaluation database, a "comprehensive stability discrimination value (T)" can be calculated on the basis of the sum of all the evaluation values in the record as illustrated, for example, in the following formula (1), and comprehensive evaluation of the path of that record can be performed.

[Math. 1]

$$T = \frac{1}{N}\sum_{i=1}^{N} a_i w_i \qquad (1)$$

In the above formula (1), N is the number of evaluation items, $a_i$ is the evaluation value of the i-th evaluation item, and $w_i$ is the additive weight given to the i-th evaluation item. A different value may be set as the additive weight $w_i$, commensurate with an application that uses the path evaluation database such as the robot specification. For example, if the robot is a model whose orbit of center of gravity is difficult to be modified, the additive weight of the evaluation item "deviation of position of center of gravity" may be increased, and if the robot is a model whose legs have only a small degree of freedom and whose landing position is difficult to be corrected, the additive weight of the evaluation item "landing position correction quantity" may be increased. It is possible to flexibly make a comprehensive evaluation of the path, commensurate with the path planning application and characteristics of the individual robots, by setting of the additive weight $w_i$.

The comprehensive stability discrimination value T as illustrated in the above formula (1) is a computation for obtaining only a sum of the postural stability evaluation items and is advantageous in that the postural stability of the path can be evaluated with a small amount of computation. It should be noted that, in the example illustrated in FIG. 3, the comprehensive stability discrimination value T is not given by a real number but is classified into four levels, namely, A, B, C, and D, commensurate with the magnitude of the value for illustration.

It should be noted that in a case where $a_i$ is used as a signed value, the comprehensive stability discrimination value may be defined by use of a square of $a_i$.

[Math. 2]

$$T = \frac{1}{N}\sum_{i=1}^{N} (a_i)^2 w_i \qquad (2)$$

B-2. Operation of Path Evaluation Database

Figure 4:
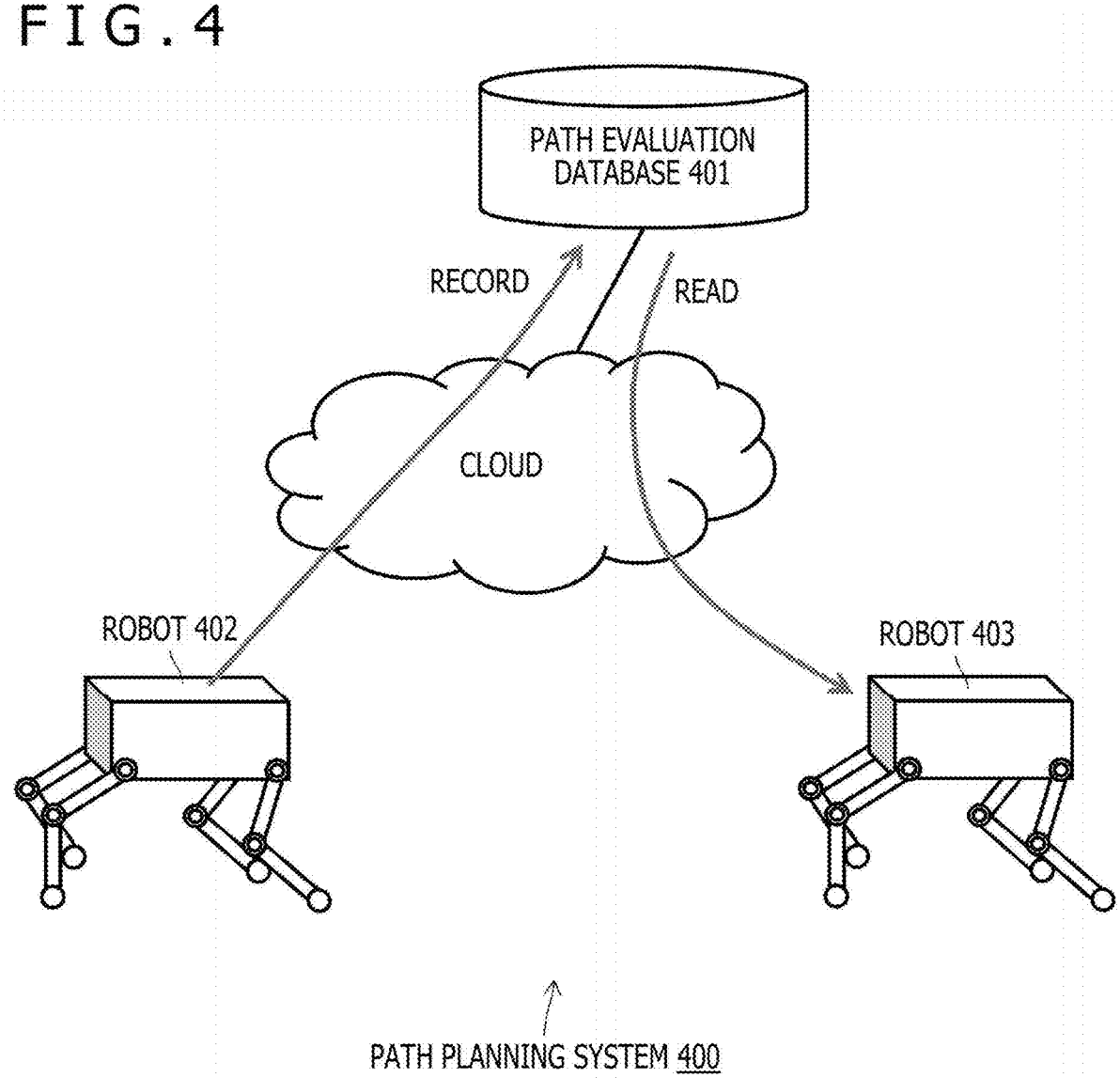
FIG. 4 is a diagram illustrating a configuration example of a path planning system 400.

FIG. 4 schematically illustrates a configuration example of a path planning system 400 that uses the path evaluation database. The path planning system 400 illustrated in FIG. 4 includes a path evaluation database 401, a robot 402, and a robot 403. The path evaluation database 401 is provided on the cloud. The robot 402 traverses the path and records a record in the path evaluation database 401. The robot 403 plans a path by using the path evaluation database 401. The robots 402 and 403 may have the configuration illustrated in FIGS. 1 and 2 or another configuration.

In the path planning system 400 illustrated in FIG. 4, the multiple robots share the path evaluation database 401. It should be noted that although only one robot each is illustrated as the robot 402 and the robot 403 in FIG. 4 for simplification of the drawing, the path planning system 400 assumes that multiple robots 402 that handle recording of a record regarding path information in the path evaluation database 401 and multiple robots 403 that handle planning of the path by using the path evaluation database 401 are available. Further, the path planning system 400 also assumes that the same robot plans a path by using the path evaluation database 401 at a certain point in time and records the record regarding path information in the path evaluation database 401 after traversing the planned path. Also, the robots can plan a new path by evaluating the path that has been used before by using the path evaluation database 401, not only in a case where the robots plan a path that has yet to be traversed but also when they head for the destination that they have visited in the past again.

The configuration of the path evaluation database 401 is as has been already described with reference to FIG. 3. When having traversed a certain path pattern, the robot 402 transfers, to the path evaluation database 401, path identification information (path pattern), information regarding the date when that path has been traversed, identification information regarding the robot 402, and information regarding each of the evaluation items representing the postural stability of the robot 401, the postural stability being measured at the time of traversing of that path pattern. The path evaluation database 401 records a record based on the information received from the robot 402. Each record of the path evaluation database 401 includes the multiple evaluation items representing the postural stability, and the evaluation items can be added or deleted as necessary. It should be noted that the comprehensive stability discrimination value T regarding the postural stability may be calculated on the side of the robot 402 and transferred to the path evaluation database 401 together with other information. Alternatively, the path evaluation database 401 may calculate the comprehensive stability discrimination value T from postural stability information received from the robot 402 and record the comprehensive stability discrimination value T in a record.

Meanwhile, when planning a path by using the path evaluation database 401, the robot 403 plans the path by searching for available records from the path evaluation database 401 and, from among the multiple records thus found, selecting the optimal record for the robot 403.

Figure 5:
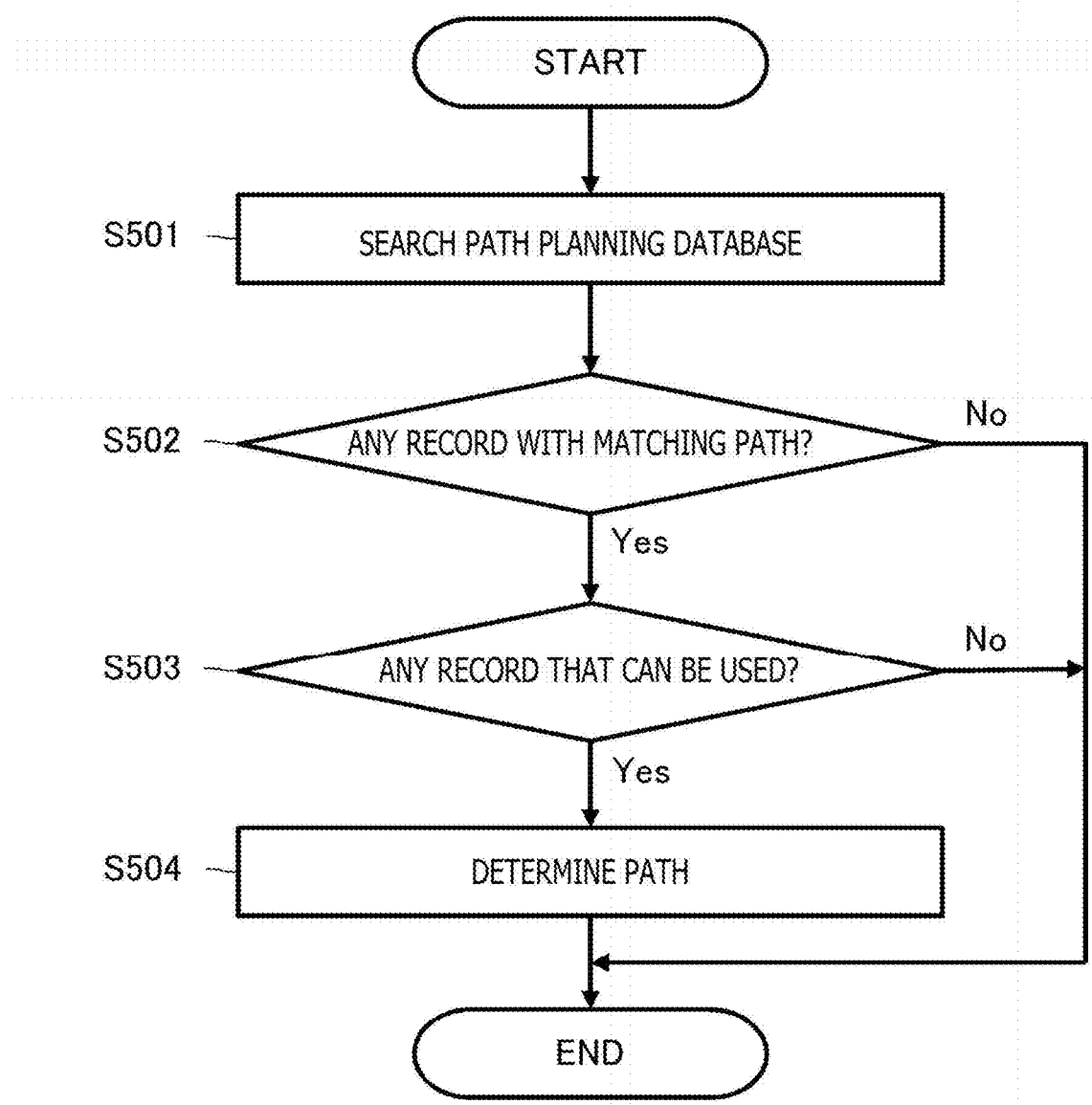
FIG. 5 is a flowchart illustrating a processing procedure for a robot 403 that operates on the path planning system 400 to plan a path by using a path evaluation database 401.

FIG. 5 illustrates, in a flowchart form, a processing procedure for the robot 403 that operates on the path planning system 400 to plan the path by using the path evaluation database 401.

The robot 403 searches the path evaluation database 401 (step S501) first and checks whether or not there is a record regarding the path connecting the current position (or the starting point) of the robot 403 to the destination (step S502).

Here, in a case where there is no record regarding the path connecting the current position (or the starting point) to the destination in the path evaluation database 401 (No in step S502), the robot 403 skips all subsequent processing steps and terminates the present process. In this case, the robot 403 plans a path to the destination on the basis of only environmental shape information acquired through the camera, the LRF, and the like.

Also, in a case where one or multiple records regarding the path connecting the current position (or the starting point) to the destination are found in the path evaluation database 401 (Yes in step S502), the robot 403 selects the optimal path from among these records. In a case where only one applicable record is found, the robot 403 plans a path on the basis of that record. It should be noted, however, that a description will be given below of a case where multiple records are found.

Next, the robot 403 refers to the robot identification information regarding the multiple candidate records regarding the path connecting the current position (or the starting point) to the destination and searches for the robot identification information that matches that of the robot 403 (step S503). In a case where no record having the robot identification information matching that of the robot 403 is found, the robot 403 searches for a record whose product specification identified by the robot identification information is similar to that of the robot 403.

In a case where no record whose robot identification information matches that of the robot 403 or whose product specification is similar to that of the robot 403 is found (No in step S503), in other words, in a case where no record whose postural stability information can be used as a useful reference is found, the robot 403 skips all subsequent processing steps and terminates the present process. In this case, the robot 403 plans a path to the destination on the basis of only environmental shape information acquired through the camera, the LRF, and the like.

Also, in a case where one or multiple records whose robot identification information matches that of the robot 403 or whose product specification is similar to that of the robot 403 are found (Yes in step S503), the robot 403 selects the optimal path from among these records. In a case where only one applicable record is found, the robot 403 plans a path on the basis of that record. It should be noted, however, that a description will be given below of a case where multiple records are found.

Next, the robot 403 compares pieces of postural stability information regarding the multiple candidate records that has been found in step S503 and that has available postural stability information and selects the record having the optimal path pattern for the robot 403 to travel to the destination (step S504).

In step S504, the robot 403 determines a path pattern to the destination by comparing the comprehensive stability discrimination values entered in the respective records and selecting the record having the highest comprehensive stability discrimination value.

Also, in a case where two or more records having the highest comprehensive stability discrimination value are found, the robot 403 may determine the path pattern to the destination by selecting the record with the most recent date. Alternatively, the robot 403 may evaluate which record is optimal by recalculating the comprehensive stability discrimination value from the evaluation items such as the deviation of the position of center of gravity, the postural deviation, the CoP control quantity, the landing position correction quantity, and the like described in each record, by using a calculation formula different from the above formula (1).

Thereafter, the robot 403 travels to the destination by using the path determined by using the path evaluation database 401 in accordance with the processing procedure illustrated in FIG. 5. Alternatively, the robot 403 cannot find the optimal path from the path evaluation database 401, plans a path to the destination on the basis of only environmental shape information acquired through the camera, the LRF, and the like, and travels to the destination. Then, once completing its travel to the destination, the robot 403 transfers path information including postural stability information acquired during the travel, to the path evaluation database 401, to record the path information therein.

Figure 6:
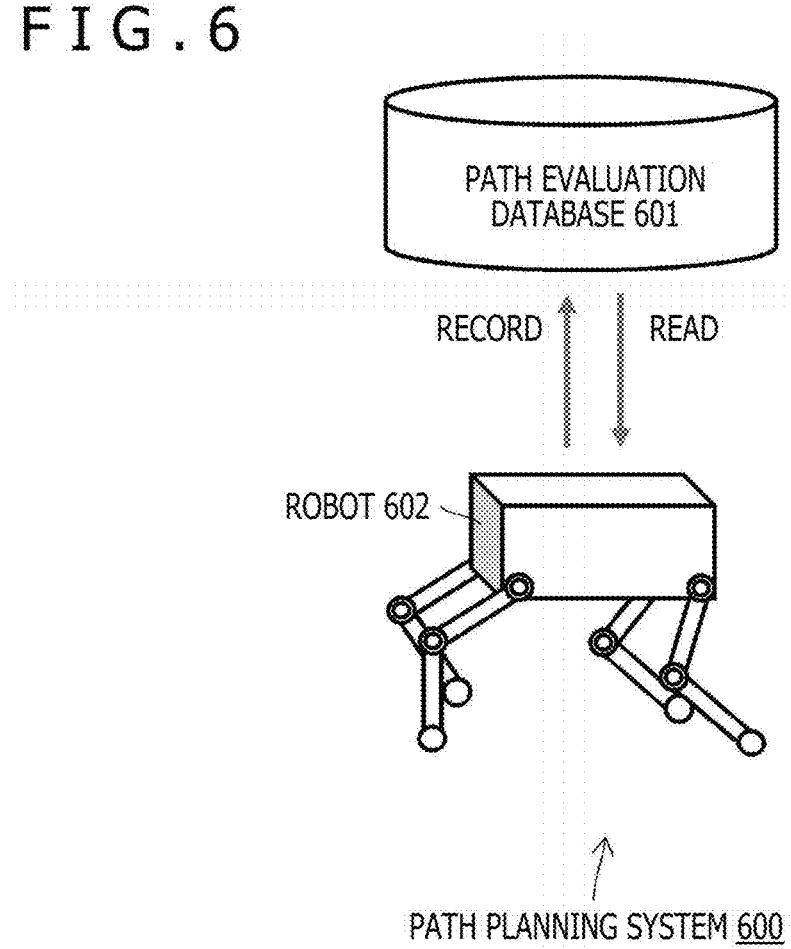
FIG. 6 is a diagram illustrating a configuration example of a path planning system 600.

FIG. 6 schematically illustrates another configuration example of a path planning system 600 using the path evaluation database. The path planning system 600 illustrated in FIG. 6 includes a path evaluation database 601 and a robot 602 that uses the path evaluation database 601. The path evaluation database 601 is used only by the robot 602 and is not shared with other robots.

The path evaluation database 601 keeps records including the multiple evaluation items representing the postural stability acquired each time the robot 602 traverses a given path. In the path planning system 600, the single robot 602 exclusively uses the path evaluation database 601 and does not share the path evaluation database 601 with other robots. Accordingly, robot identification information items are not necessary in the records of the path evaluation database 601.

FIG. 7 illustrates a configuration example of the path evaluation database 601. Each record of the path evaluation database 601 includes path identification information that identifies the path traversed by the robot, information regarding the date when the robot has traversed that path (Date), and postural stability information. Postural stability information includes the multiple evaluation items that represent the postural stability measured when the robot has traversed a path as described above. It should be noted that although omitted in FIG. 7, each record may include environmental shape information such as projections and depressions of the road surface measured in the path by use of the camera, the LRF, and the like. The evaluation items included in each record can be added or deleted as necessary. Details of each evaluation item are as described already.

When having traversed a certain path pattern, the robot 602 transfers, to the path evaluation database 601, path identification information (path pattern), information regarding the date when that path has been traversed, and information regarding each of the evaluation items representing the postural stability of the robot 601 at the time of traversing of that path pattern. The path evaluation database 601 records a record based on the information received from the robot 602. It should be noted that the comprehensive stability discrimination value T regarding the postural stability may be calculated on the side of the robot 602 and transferred to the path evaluation database 601 together with other information. Alternatively, the path evaluation database 601 may calculate the comprehensive stability discrimination value T from postural stability information received from the robot 602 and record the comprehensive stability discrimination value T in a record.

Meanwhile, when planning a path by using the path evaluation database 601, the robot 603 plans the path by searching for available records from the path evaluation database 601 and, from among the multiple records thus found, selecting the optimal record for the robot 603.

FIG. 8 illustrates, in a flowchart form, a processing procedure for the robot 602 that operates on the path planning system 600 to plan a path by using the path evaluation database 601.

The robot 602 searches the path evaluation database 601 (step S801) first and checks whether or not there is a record regarding the path connecting the current position (or the starting point) of the robot 602 to the destination (step S802).

Here, in a case where there is no record regarding the path connecting the current position (or the starting point) to the destination in the path evaluation database 601 (No in step S802), the robot 602 skips all subsequent processing steps and terminates the present process. In this case, the robot 602 plans a path to the destination on the basis of only environmental shape information acquired through the camera, the LRF, and the like.

Also, in a case where one or multiple records regarding the path connecting the current position (or the starting point) to the destination are found in the path evaluation database 601 (Yes in step S602), the robot 602 selects the optimal path from among these records. In a case where only one applicable record is found, the robot 602 plans a path on the basis of that record. It should be noted, however, that a description will be given below of a case where multiple records are found.

Next, the robot 602 compares pieces of postural stability information regarding the multiple candidate records regarding the path connecting the current position (or the starting point) to the destination and selects the record having the optimal path pattern for the robot 602 to travel to the destination (step S803).

In step S803, the robot 602 determines a path pattern to the destination by comparing the comprehensive stability discrimination values entered in the respective records and selecting the record having the highest comprehensive stability discrimination value. Also, in a case where two or more records having the highest comprehensive stability discrimination value are found, the robot 602 may determine the path pattern to the destination by selecting the record with the most recent date.

Thereafter, the robot 602 travels to the destination by using the path determined by using the path evaluation database 601 in accordance with the processing procedure illustrated in FIG. 8. Alternatively, the robot 602 cannot find the optimal path from the path evaluation database 601, and the robot 403 travels to the destination by planning a path to the destination on the basis of only environmental shape information acquired through the camera, the LRF, and the like. Then, once completing its travel to the destination, the robot 602 transfers path information including postural stability information acquired during the travel to the path evaluation database 601, to record the path information therein.

Even in a case where the single robot 602 exclusively uses the path evaluation database 601, the robot 602 can acquire a highly stable path by itself, for example, by randomly selecting a path in a certain field and repeatedly traversing the path.

C. Advantageous Effects

Advantageous effects acquired by application of the present disclosure to plan a robot path are summarized below.

(1) Data including postural stability information regarding a robot relative to a path is accumulated in a path evaluation database as a result of planning of various paths by the robot. The robot can realize high-level path planning including not only environmental shape information but also postural stability of the robot which is travelling in the path by using the path evaluation database when planning a path.

(2) The robot can select a path in which postural stability of the robot which is travelling in the path is taken into consideration, by planning the path by using the path evaluation database. As a result, it is possible to reduce risks of the robot toppling over.

(3) It is possible to plan a path that ensures efficiency and high postural stability by collecting, in the path evaluation database, information regarding path planning carried out by many robots and planning a robot path by use of the path evaluation database.

(4) Even if there is no record regarding traversing of the same path by the same robot in the path evaluation database, it is possible to determine a path that provides high postural stability, by use of a record of a robot having a similar product specification as a reference.

(5) When a human imposes a task on a robot, it is possible to determine a path that ensures high postural stability in consideration of the task, by adding information regarding the task, such as baggage loading conditions, imposed on the robot by the human to records in the path evaluation database.

(6) It is possible for a robot to acquire, by itself, a path that ensures high stability, by randomly selecting a path in a certain field and repeatedly traversing the path.

INDUSTRIAL APPLICABILITY

The present disclosure has been described in detail above with reference to a specific embodiment. However, it is apparent that a person skilled in the art can modify or substitute the embodiment concerned without departing from the gist of the present disclosure.

Although, in the description of the present specification, an emphasis has been placed on the embodiment in which the present disclosure is applied to a legged robot, the present disclosure is similarly applicable to a robot that searches for a path on a road surface by means other than legs. Further, the present disclosure is also applicable to an electric wheelchair, an electric standing motorcycle such as Segway, a unstable mobile apparatus such as an electric bike, and a mobile apparatus, other than a robot, that travels on the road surface, such as a drone, and it is possible to plan a path in consideration of the postural stability of the main body of the apparatus which is travelling, on the basis of history information held of paths and the like, other than environmental shape information acquired on the basis of the camera, the LRF, and the like.

In short, the present disclosure has been described in the form of illustration, and the contents of description of the present specification should not be interpreted in a limited manner. In order to determine the gist of the technology disclosed in present specification, claims should be taken into consideration.

It should be noted that the technology disclosed in the present specification can also have the following configurations.

(1)
An information processing apparatus including:
a management section adapted to manage path information for each path, the path information including postural stability information acquired when a mobile robot traverses the path.

(2)
The information processing apparatus according to (1), in which
the postural stability information includes at least one of a variance of a position of center of gravity or a postural variance acquired during travel of the mobile robot in the path.

(3)
The information processing apparatus according to (1) or (2), in which
the postural stability information includes information regarding a degree of achievement of a control target of the mobile robot.

(4)
The information processing apparatus according to (3), in which
the postural stability information includes a deviation between the control target based on a control law and an actual measured value of the mobile robot.

(5)
The information processing apparatus according to (4), in which
the postural stability information includes a CoP control quantity that includes a deviation between a target CoP and an actual measured value of the mobile robot whose walking is controlled on the basis of a ZMP.

(6)
The information processing apparatus according to any one of (1) to (5), in which
the postural stability information further includes a landing position correction quantity that includes an error between a planned floor touching point and an actual measured value of the mobile robot that walks with multiple legs.

(7)
The information processing apparatus according to any one of (1) to (6), in which
the management section manages the path information in association with identification information regarding the mobile robot that has traversed the path.

(8)
The information processing apparatus according to any one of (1) to (7), in which
the management section manages the path information in association with information regarding a date when the mobile robot has traversed the path.

(9)
The information processing apparatus according to any one of (1) to (8) further including:
a provision section adapted to provide the path information managed by the management section to the mobile robot.

(10)
An information processing method including:
an acquisition step of acquiring, from a mobile robot, path information for each path, the path information including postural stability information acquired when the mobile robot traverses the path; and
a recording step of recording the path information in a management section.

(11)
A computer program written in a computer-readable form, the computer program causing a computer to function as:
a management section adapted to manage path information for each path, the path information including postural stability information acquired when a mobile robot traverses the path.

(12)
A mobile robot including:
a mobile section;
a transmission section adapted to transmit, to an external apparatus, path information including postural stability information regarding a main body, the postural stability information being acquired when the mobile robot traverses a path by using the mobile section; and
a planning section adapted to plan a path on the basis of the postural stability information included in the path information received from the external apparatus.

REFERENCE SIGNS LIST

100: Robot apparatus
101: Loading section
110: Mobile leg
111: Link (second link)
112: Link (first link)
113: Joint section (second joint)
114: Joint section (first joint)
120: Mobile leg
121: Link (second link)
122: Link (first link)
123: Joint section (second joint)
124: Joint section (first joint)
130: Mobile leg
131: Link (second link)
132: Link (first link)
133: Joint section (second joint)
134: Joint section (first joint)
140: Mobile leg
141: Link (second link)
142: Link (first link)
143: Joint section (second joint)
144: Joint section (first joint)
210: External sensor section
211L, 211R: Camera
212: Microphone
213: Touch sensor
221: Speaker
222: Display section
230: Control unit
231: Main control section
232: Battery
233: Internal sensor section
233A: Battery sensor
233B: Acceleration sensor
234: External memory
235: Communication section
400: Path planning system
401: Path evaluation database
402, 403: Robot
600: Path planning system
601: Path evaluation database
602: Robot

The invention claimed is:

1. An information processing apparatus, comprising:
at least one processor configured to:
    acquire path information associated with at least one path traversed by a mobile robot, wherein
        the path information includes postural stability information,
        the postural stability information includes a degree of achievement of a control target of the mobile robot, and
        the path information is acquired during a travel of the mobile robot in the at least one path; and
    control a movement of the mobile robot based on the path information.

2. The information processing apparatus according to claim 1, wherein the postural stability information further includes at least one of a variance of a position of a center of gravity or a postural variance acquired during the travel of the mobile robot in the at least one path.

3. The information processing apparatus according to claim 1, wherein the postural stability information further includes a deviation between the control target based on a control target value and an actual measured value of the mobile robot.

4. The information processing apparatus according to claim 3, wherein
    the at least one processor is further configured to control the movement of the mobile robot based on a Zero Moment Point (ZMP),
    the ZMP corresponds to a Centre of Pressure (CoP) applied by a road surface in the at least one path traversed by the mobile robot, and
    the postural stability information further includes a CoP control quantity that includes a deviation between a target CoP and the actual measured value of the mobile robot.

5. The information processing apparatus according to claim 1, wherein
    the postural stability information further includes a landing position correction quantity that includes an error between a planned floor touching points of the mobile robot and an actual measured value of the mobile robot, and
    the mobile robot walks with multiple legs.

6. The information processing apparatus according to claim 1, wherein
    the at least one processor is further configured to manage the path information in association with identification information associated with the mobile robot.

7. The information processing apparatus according to claim 1, wherein the at least one processor is further configured to manage the path information in association with information associated with a date on which the mobile robot traversed the at least one path.

8. The information processing apparatus according to claim 1, wherein the at least one processor is further configured to provide the path information to the mobile robot.

9. A non-transitory computer-readable medium having stored thereon computer-executable instructions that when executed by a processor, cause the processor to execute operations, the operations comprising:
    acquiring path information associated with at least one path traversed by a mobile robot, wherein
        the path information includes postural stability information,
        the postural stability information includes a degree of achievement of a control target of the mobile robot, and
        the path information is acquired during a travel of the mobile robot in the at least one path; and
    controlling a movement of the mobile robot based on the path information.

* * * * *